(12) United States Patent
Borroni-Bird et al.

(10) Patent No.: US 7,303,211 B2
(45) Date of Patent: Dec. 4, 2007

(54) FUEL CELL VEHICLE ARCHITECTURE

(75) Inventors: Christopher E. Borroni-Bird, Oakland Township, MI (US); Mohsen D. Shabana, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/223,788

(22) Filed: Sep. 9, 2005

(65) Prior Publication Data

US 2006/0027406 A1 Feb. 9, 2006

Related U.S. Application Data

(63) Continuation-in-part of application No. 10/202,396, filed on Jul. 24, 2002.

(60) Provisional application No. 60/314,501, filed on Aug. 23, 2001, provisional application No. 60/337,994, filed on Dec. 7, 2001, provisional application No. 60/608,585, filed on Sep. 10, 2004.

(51) Int. Cl.
*B60P 3/22* (2006.01)
*B62D 21/02* (2006.01)

(52) U.S. Cl. ............... 280/831; 280/830; 280/834; 280/783; 280/781; 429/34; 429/9

(58) Field of Classification Search ......... 280/831, 280/830, 834, 783, 781; 429/34, 9
See application file for complete search history.

(56) References Cited

U.S. PATENT DOCUMENTS

| | | | | |
|---|---|---|---|---|
| 4,457,525 A * | 7/1984 | Tanaka et al. | ............... | 280/834 |
| 5,370,418 A | 12/1994 | Pugh | ............... | 280/830 |
| 5,673,939 A * | 10/1997 | Bees et al. | ............... | 280/831 |
| 6,190,793 B1 * | 2/2001 | Barton et al. | ............... | 429/34 |
| 6,257,360 B1 * | 7/2001 | Wozniak et al. | ............... | 180/69.5 |
| 6,481,751 B1 * | 11/2002 | Davis et al. | ............... | 280/831 |
| 6,676,163 B2 * | 1/2004 | Joitescu et al. | ............... | 280/834 |
| 6,887,596 B2 * | 5/2005 | Leban | ............... | 429/9 |
| 2006/0027406 A1 * | 2/2006 | Borroni-Bird et al. | ............... | 180/65.3 |
| 2006/0061080 A1 * | 3/2006 | Luttinen et al. | ............... | 280/784 |

* cited by examiner

*Primary Examiner*—Lesley D. Morris
*Assistant Examiner*—Marlon Arce-Diaz

(57) ABSTRACT

A vehicle chassis includes a frame defining a cavity, and a tank configured to store compressed hydrogen gas. The tank is at least partially located within the cavity, and is longitudinally oriented with respect to the frame to maximize the fuel-storage capability of the vehicle chassis. In an exemplary embodiment, a floorpan includes a concavity to accommodate at least a portion of the tank, with a corresponding protuberance in the passenger compartment floor surface of the vehicle chassis.

10 Claims, 5 Drawing Sheets

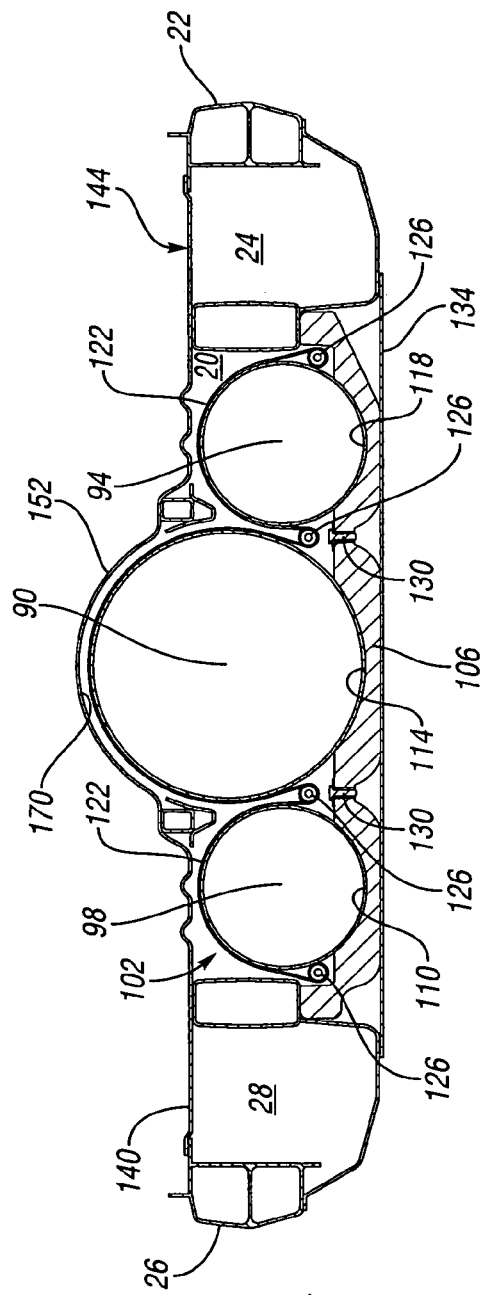
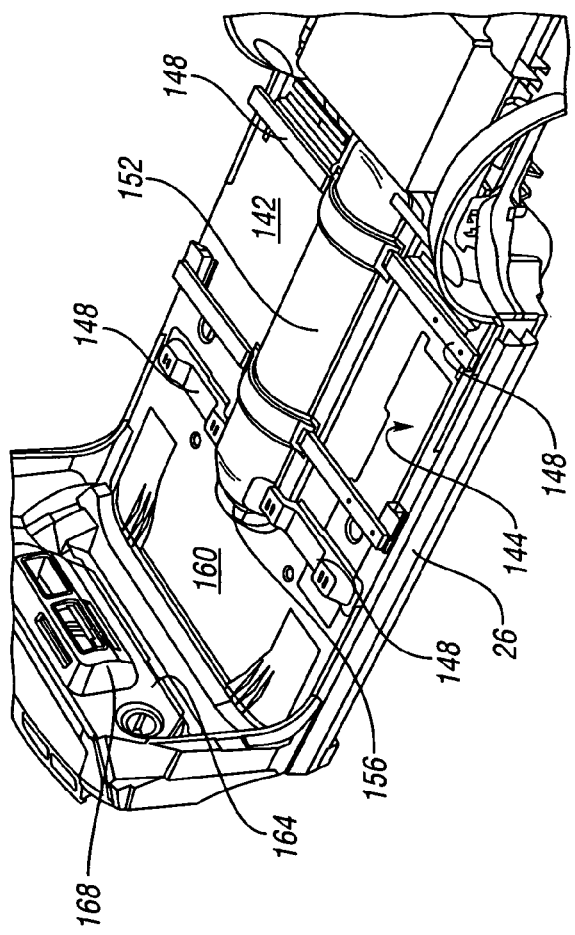
FIG. 4
FIG. 5

FUEL CELL VEHICLE ARCHITECTURE

CROSS REFERENCE TO RELATED APPLICATIONS

This application is a continuation in part of U.S. patent application Ser. No. 10/202,396, filed Jul. 24, 2002, which claims the benefit of U.S. Provisional Application 60/314,501, filed Aug. 23, 2001, and U.S. Provisional Application 60/337,994, filed Dec. 7, 2001; this application also claims the benefit of U.S. Provisional Patent Application No. 60/608,585, filed Sep. 10, 2004; each of the aforementioned applications is hereby incorporated by reference in its entirety.

TECHNICAL FIELD

This invention relates to vehicle chassis and powertrains having longitudinally-oriented compressed-gas storage tanks beneath a passenger compartment.

BACKGROUND OF THE INVENTION

Prior art vehicles typically include an internal combustion engine that is contained in an engine compartment in the front or rear of the vehicle body. The engine is fueled by a liquid, such as gasoline or diesel fuel, which is typically stored in a tank toward the rear of the vehicle. The engine drives the vehicle by applying torque to road wheels through a mechanical transmission.

Alternative vehicle fuels, such as compressed hydrogen and natural gas, have lower specific thermal energy per unit volume than liquid fuels like gasoline and diesel fuel, i.e., they have relatively low energy density. Accordingly, an alternative fuel vehicle may have a significantly reduced driving range before refueling than a conventional fuel vehicle with identical fuel storage capacity. It is therefore desirable for alternative fuel vehicles to accommodate larger fuel storage tanks than those found in conventional fuel vehicles.

It is also desirable to place alternative fuel storage tanks in a protected location within the vehicle chassis. Accordingly, alternative fuel storage tanks are typically placed between the rear wheels of the vehicle. However, packaging space between the rear wheels is limited, which, in turn, limits the size of the tanks and the vehicle travel range between refuelings.

SUMMARY OF THE INVENTION

According to a first aspect of the invention, a vehicle is provided having improved gaseous fuel storage capability. The vehicle includes a frame defining a central cavity or compartment, and a tank configured to store compressed hydrogen. The tank is at least partially located within the cavity and is longitudinally oriented with respect to the frame. In an exemplary embodiment, a floorpan is connected with respect to the frame and covers the cavity. The floorpan defines a partially cylindrical concavity in which the tank is at least partially located, and a corresponding protuberance on the other side of the floorpan from the concavity, i.e., the vehicle floor surface.

According to a second aspect of the invention, a fuel cell vehicle is provided with design flexibility whereby a decrease in fuel tank size enables an increase in fuel cell stack size. The fuel cell stack is located adjacent to the fuel tank, and is oriented such that additional fuel cells may be added on the side of the stack that faces the tanks. Accordingly, when a long tank is removed and replaced with a shorter tank, the fuel cell stack can be enlarged by adding fuel cells which occupy space formerly occupied by the large tank. The design also accommodates vehicle manufacturers, who can assemble a plurality of vehicles having a common chassis and frame design, but having different fuel cell and tank configurations.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic cross sectional view of the frame and hydrogen storage tanks of the chassis of FIG. 1;

FIG. 5 is a schematic perspective view of the chassis of FIG. 1 illustrating a tunnel formed in the floorpan to accommodate one of the hydrogen storage tanks of FIG. 4.

DESCRIPTION OF THE PREFERRED EMBODIMENTS

Figure 1:
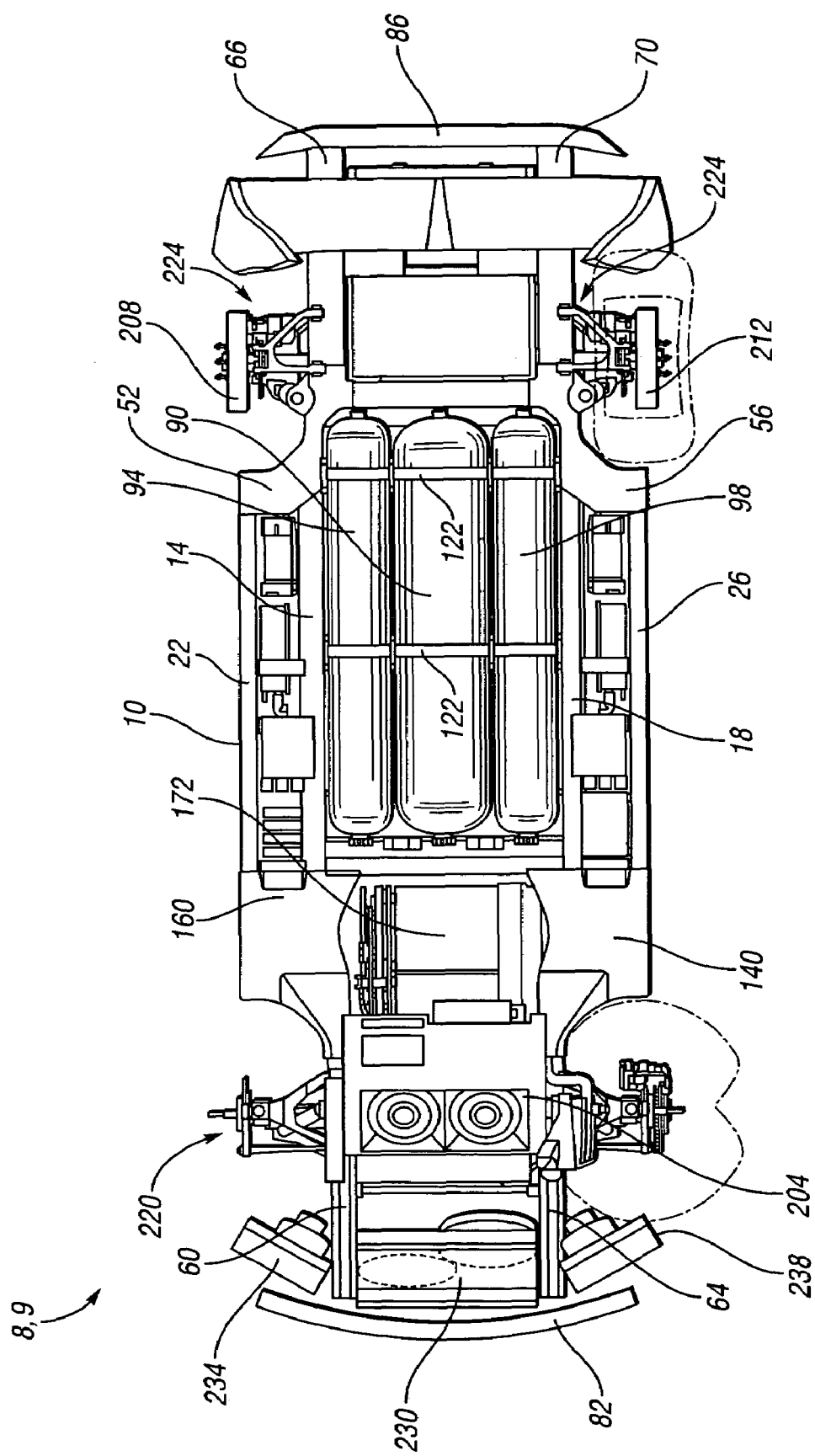
FIG. 1 is a schematic, partial cutaway top view of a chassis for a vehicle in accordance with the invention.
Figure 2:
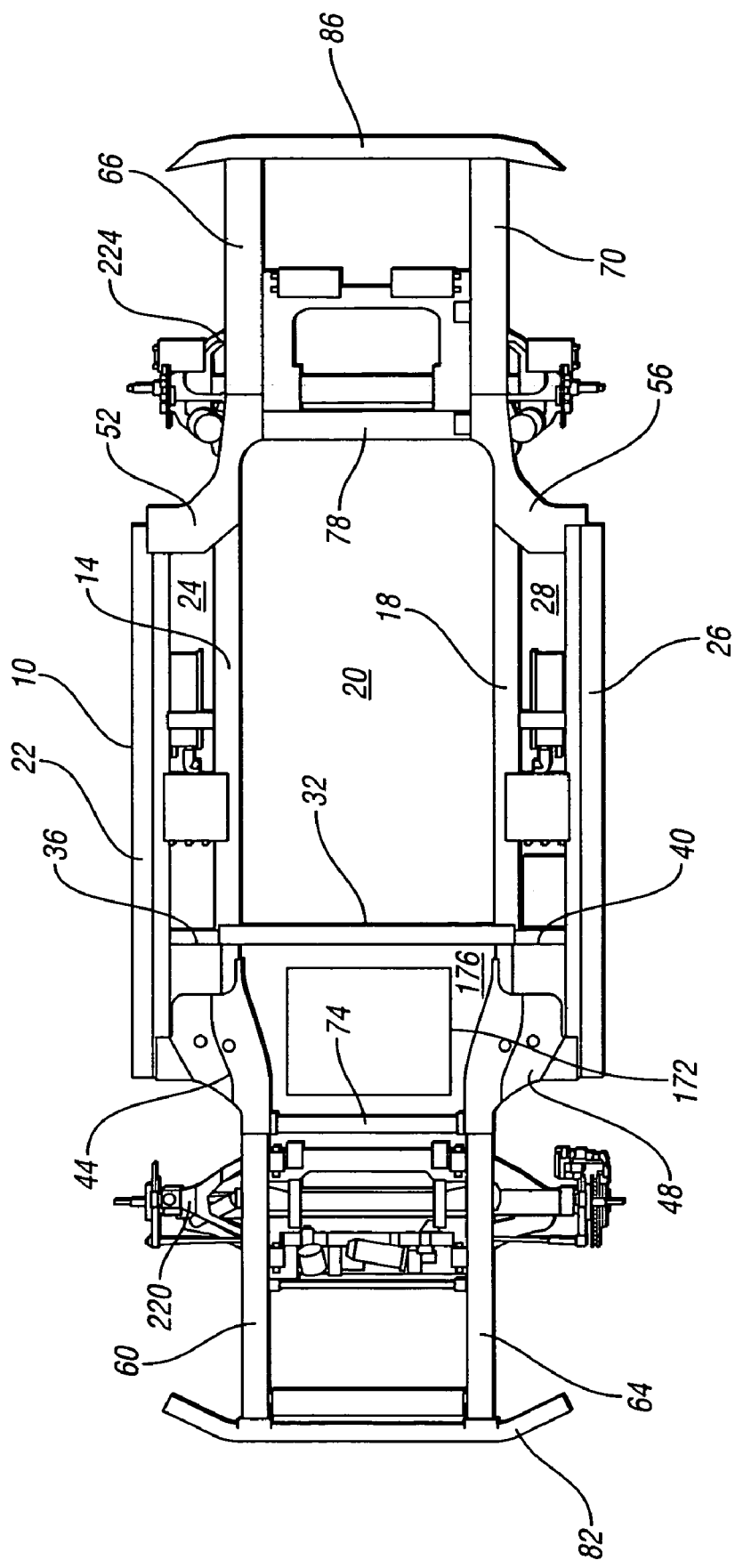
FIG. 2 is a schematic top view of the frame of the chassis of FIG. 1.
Figure 3:
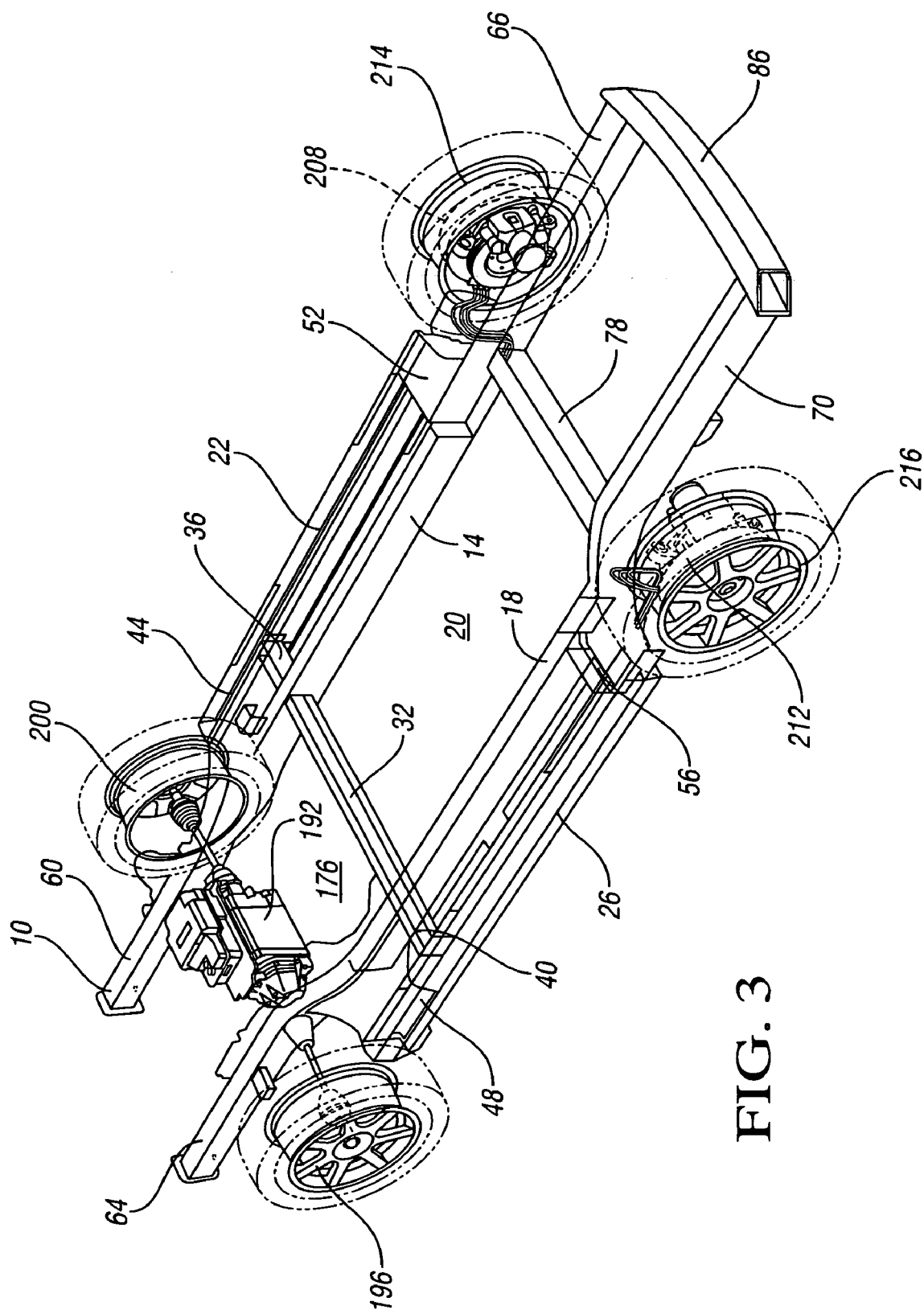
FIG. 3 is a schematic perspective view of the frame of FIG. 2 with wheels and a front traction motor mounted with respect thereto.

Referring to FIG. 1, a chassis 8 for a vehicle 9 is schematically depicted. The chassis includes a structural frame 10. Referring to FIGS. 2 and 3, the frame includes a first rail 14 and a second rail 18 cooperating to at least partially define a protected cavity 20 therebetween. A third rail 22 is outboard of the first rail 14 and cooperates with the first rail 14 to at least partially define a first lateral cavity 24 outboard of the protected cavity 20. A fourth rail 26 is outboard of the second rail 18 and cooperates with the second rail 18 to at least partially define a second lateral cavity 28 outboard of the protected cavity 20. Various chassis components are shown inside the lateral cavities 24, 28. Cross member 32 rigidly interconnects the first and second rails 14, 18. Cross member 36 rigidly interconnects the first and third rails 14, 22. Cross member 40 rigidly interconnects the second and fourth rails 18, 26.

The frame 10 also includes a first node 44, a second node 48, a third node 52, and a fourth node 56. The nodes, which are preferably cast, substantially rigidly interconnect various members of frame 10. More specifically, the first node 44 interconnects a first front member 60 with the first rail 14 and the third rail 22. The second node 48 interconnects a second front member 64 with the second rail 18 and the fourth rail 26. The third node 52 interconnects a first rear frame member 66 to the first and third rails 14, 22. The fourth node 56 interconnects a second rear frame member 70 to the second and fourth rails 18, 26.

Cross member 74 connects the first and second nodes 44, 48. Cross member 78 connects the third and fourth nodes 52, 56. A front bumper member 82 is connected to the two front members 60, 64. A rear bumper member 86 is connected to the two rear members 66, 70. Rails 14, 18, 22, 26 and frame members 60, 64, 66, 70 are preferably extruded or hydroformed aluminum tubes.

Referring specifically to FIG. 1, the vehicle 9 includes three generally cylindrical tanks 90, 94, 98 configured to store compressed hydrogen. Tank 90 is longer and has a larger diameter than tanks 94 and 98. Tanks 94 and 98 are substantially the same size, and are positioned on opposite sides of tank 90. The tanks 90, 94, 98 are at least partially located within the protected central cavity 20 of the frame 10.

Referring to FIG. 4, wherein like reference numbers refer to like components from FIGS. 1-3, a tank carrier assembly 102 includes at least one base member 106 that defines three depressions or concavities 110, 114, 118. The surface defining each of the concavities is partially cylindrical having a diameter slightly larger than the diameter of one of tanks 90, 94, 98. Tank 94 is partially located within concavity 110; tank 90 is partially located within concavity 114; and tank 98 is partially located within concavity 118. Accordingly, the concavities function to at least partially locate and retain a respective tank.

The tank carrier assembly 102 further includes a strap 122, shackles 130 connected to the base member 106, and bushings 126 each being connected to the yoke by a respective shackle 130. It may be desirable to employ T-bolts instead of shackles. The strap 122 is preferably stainless steel. One side of the strap 122 contacts a portion of the circumference of each of the tanks 90, 94, 98. The other side of the strap 122 contacts a portion of the circumference of the rubber bushings 126 so that the strap 122 is in tension and retains the tanks 90, 94, 98 against the base member 106. The rubber bushings 126 are deformable to allow variations in the tank dimensions as a result of pressurization. Rubber isolation (not shown) is preferably employed between the stainless steel strap 122 and the tanks 90, 94, 98 to protect the tank material and to further accommodate variations in tank dimensions. Cavities 24, 28 form energy-absorbing crush spaces on respective lateral sides of the cavity 20.

A belly pan 134 seals the lower opening of the protected cavity 20. A floorpan 140 extends above and across the upper opening of the protected cavity 20, and forms a rigid floor surface 144 of the vehicle interior compartment or passenger space 142. Within the scope of the claimed invention, the rigid floor surface 144 may include one or more coverings such as padding or carpet (not shown). The belly pan 134, floorpan 140, and rails 14, 18 define a hydrogen storage compartment that is at least partially coextensive with the cavity 20. Referring to FIGS. 4 and 5, the floor surface 144 is substantially flat, and provides mounting points 148 at which front and rear passenger seats (not shown) are connectable to the floor pan 140. The floor pan 140 is characterized by a tunnel 152 formed therein. The tunnel 152 is a partially cylindrical protuberance in the generally flat floor surface 144 to accommodate the size of tank 90. The forwardmost extent 156 of the tunnel does not extend significantly forward of the front seats or the mounting points 148 for the front seats, leaving a substantially flat region 160 of the vehicle floor 144 that extends longitudinally between the front seats and the bulkhead 164 or instrument panel 168. The substantially flat region 160 extends transversely from one lateral edge of the floor pan to the other lateral edge of the floor pan.

Referring again to FIG. 4, a partially cylindrical concavity 170 in which the tank 90 is partially located is opposite from the protuberance in the vehicle floor surface.

Figure 6:
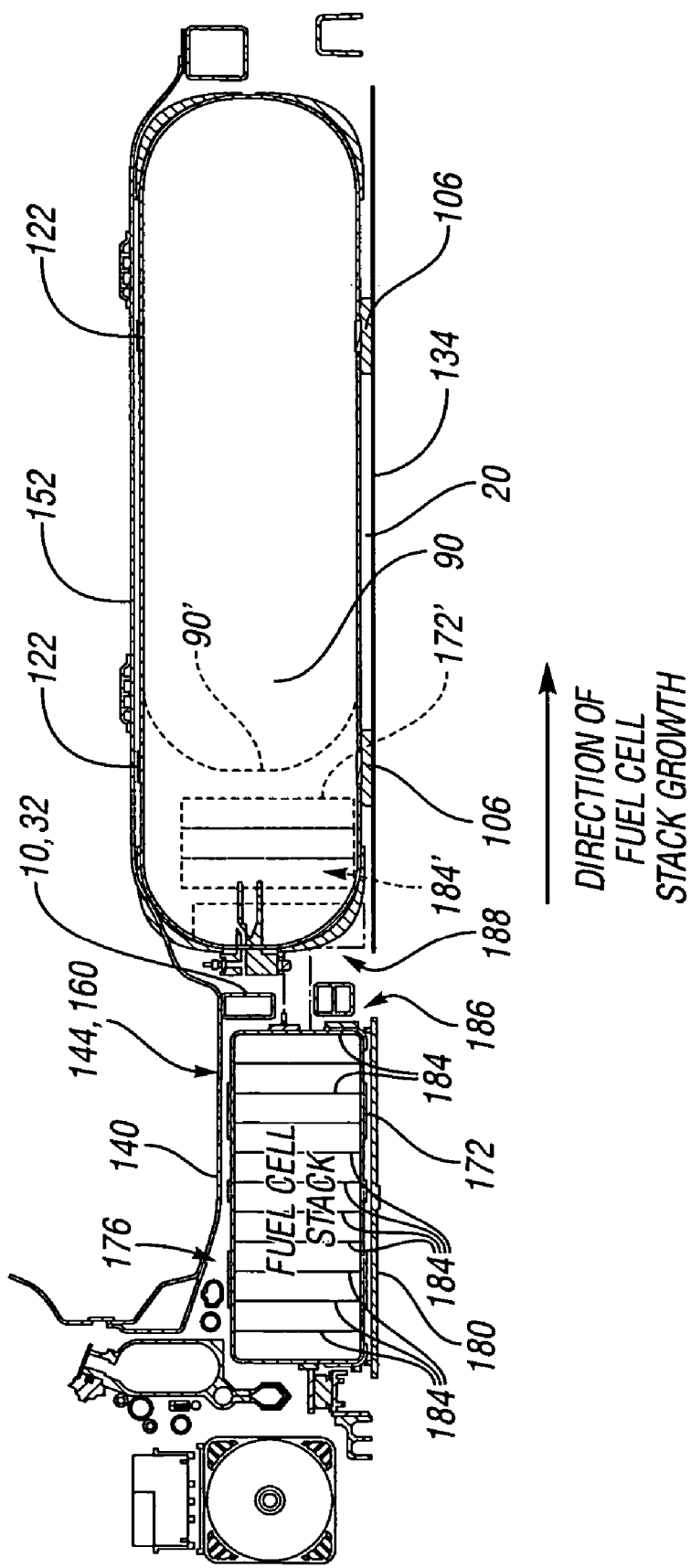
FIG. 6 is a schematic cross sectional side view of the fuel cell stack and hydrogen storage of the chassis of FIG. 1.

Referring again to FIGS. 1 and 2, the vehicle also includes a fuel cell stack 172. The fuel cell stack 172 is contained within a cavity 176 formed between nodes 44 and 48, as shown in FIG. 2. The fuel cell stack is under the substantially flat region 160 of the floorpan 140, which is shown partially cut away in FIG. 1. The tanks 90, 94, 98 are operatively connected to the fuel cell stack 172 to selectively supply the stack 172 with hydrogen gas. Referring to FIG. 6, wherein like reference numbers refer to like components from FIGS. 1-5, the floorpan 140 and a lower protective cover 180 at least partially define a fuel cell stack compartment that is at least partially coextensive with cavity 176. The fuel cell stack compartment is adjacent to the hydrogen tank compartment, and the frame 10 provides an unobstructed opening to connect the fuel cell stack and hydrogen tank compartments, such as under or through cross member 32. The tanks are oriented longitudinally with respect to the vehicle, and the fuel cell stack 172 is located forward of the tanks.

The fuel cell stack 172 is formed of individual fuel cells 184 electrically interconnected. The size, and therefore the power, of the fuel cell stack 172 can be changed by adding or removing fuel cells to the stack. The fuel cell stack 172 in the vehicle is oriented so that additional fuel cells can be added to the stack at the stack's rearward end 186. The design of the vehicle is therefore such that shorter hydrogen storage tanks, i.e. tanks with a smaller longitudinal dimension, may replace tanks 90, 94, 98. The shorter hydrogen storage tanks provide increased space in the forward region 188 of the hydrogen tank compartment compared to tanks 90, 94, 98. The fuel cell stack 178 may then be enlarged by adding fuel cells to the rearward end 186 of the stack 172, with at least some of the added fuel cells occupying space in the hydrogen tank compartment formerly occupied by the tanks 90, 94, 98. Thus, the design and architecture of the vehicle provides design flexibility: by reducing the size of the hydrogen storage tanks, space is made available in the direction of fuel cell stack growth to accommodate more fuel cells. Similarly, reducing the size of the fuel cell stack provides increased packaging space for tanks.

Thus, for example, a smaller tank, such as that shown at 90', may replace tank 90. Additional fuel cells 184' may be added to the fuel cell stack such that the fuel cell stack extends from cavity 176 into cavity 20. Such an enlarged fuel cell stack is shown at 172'. Thus, fuel cell stack 172' occupies space formerly occupied by tank 90.

Referring again to FIGS. 1-3, the fuel cell stack 172 provides electrical energy to traction motor 192, which is operatively connected to front wheels 196, 200. The traction motor is located underneath an HVAC unit, shown at 204 in FIG. 1. Individual rear wheel hub motors 208, 212 drive rear wheels 214, 216, respectively. The front wheels 196, 200 are rotatably connected to a front suspension system 220, which is mounted to the frame 10. Rear wheels 214, 216 are rotatably connected to a rear suspension system 224, which is mounted to the frame 10. The wheels each have a tire mounted thereon.

With the tanks 90, 94, 98 and fuel cell stack 172 being located beneath the passenger compartment, the forward end of the vehicle is provided with improved air flow in the region that contains an engine in a conventional vehicle. Referring specifically to FIG. 1, the vehicle 9 includes a central radiator 230 and lateral radiators 234, 238 being positioned on respective sides of central radiator 230.

While the best modes for carrying out the invention have been described in detail, those familiar with the art to which this invention relates will recognize various alternative designs and embodiments for practicing the invention within the scope of the appended claims.

The invention claimed is:

1. A vehicle chassis comprising:
   a frame defining at least one cavity;
   at least one tank configured to store compressed hydrogen gas, at least partially located within said at least one cavity, and being longitudinally oriented with respect to the frame;
   a member being positioned above said at least one cavity and defining a concavity being at least partially cylindrical in shape; wherein said at least one tank is at least partially located within said concavity;
   wherein said member at least partially defines a rigid floor surface of a passenger compartment; and
   wherein said member defines a protuberance in the rigid floor surface opposite the concavity.

2. The vehicle chassis of claim 1, further comprising a fuel cell stack being operatively connected to said at least one tank.

3. The vehicle chassis of claim 2, wherein said at least one cavity includes a first cavity and a second cavity; and wherein said at least one tank is at least partially located in said first cavity and said fuel cell stack is at least partially located within said second cavity.

4. The vehicle chassis of claim 3, wherein said first cavity and said second cavity are adjacent one another.

5. The vehicle chassis of claim 2, wherein said fuel cell stack includes a plurality of fuel cell plates operatively interconnected, the fuel cell stack being sufficiently positioned with respect to the tank such that additional fuel cell plates are operatively connectable to the fuel cell stack in the direction of said at least one tank.

6. The vehicle chassis of claim 1, wherein said rigid floor surface is substantially flat at a forward end of said passenger compartment.

7. A method for retrofitting a vehicle chassis having at least one original compressed gas storage tank and a fuel cell stack, the method comprising:
   removing said at least one original compressed gas storage tank from the vehicle chassis;
   installing at least one replacement compressed gas storage tank into the vehicle chassis, said at least one replacement compressed gas storage tank being smaller than said at least one original compressed gas storage tank; and
   increasing the size of the fuel cell stack such that at least a portion of the fuel cell stack occupies space formerly occupied by said at least one original compressed gas storage tank.

8. A vehicle comprising:
   a tank configured to store compressed gas and being longitudinally oriented with respect to the vehicle;
   a floorpan having a first side that functions as a floor surface partially defining a passenger compartment floor and a second side opposite the first side, the floorpan characterized by a concavity on the second side in which the tank is at least partially located and a corresponding protuberance on the first side opposite the concavity;
   a frame having a first rail, a second rail cooperating with the first rail to at least partially define a hydrogen tank stowage cavity in which the tank is at least partially located; a third rail outboard of the first rail and cooperating with the first rail to at least partially define a first lateral cavity outboard of the hydrogen storage cavity; and a fourth rail outboard of the second rail and cooperating with the second rail to at least partially define a second lateral cavity outboard of the hydrogen storage cavity; wherein the floorpan at least partially covers each of the hydrogen storage cavity, the first lateral cavity, and the second lateral cavity.

9. The vehicle of claim 8, further comprising a belly pan operatively connected to the frame underneath the hydrogen storage cavity.

10. A vehicle chassis comprising:
    a frame defining at least one cavity;
    at least one tank configured to store compressed hydrogen gas, at least partially located within said at least one cavity, and being longitudinally oriented with respect to the frame;
    wherein said frame includes first and second rails being longitudinally-oriented; said at least one tank being between said first and second rails; and
    wherein said at least one tank extends higher than said first and second rails.

* * * * *